United States Patent [19]

Smirnov et al.

[11] Patent Number: 5,612,130
[45] Date of Patent: Mar. 18, 1997

[54] FIRE RESISTANT MULTIPURPOSE PROTECTIVE COATING

[75] Inventors: Aleksandr V. Smirnov; Oleg G. Orlov; Pyotr N. Golipad; Yurii N. Koriakin, all of Moscow, Russian Federation

[73] Assignee: Herbert F. Boeckmann, II, Sepulveda, Calif.

[21] Appl. No.: 416,744

[22] PCT Filed: Oct. 4, 1993

[86] PCT No.: PCT/US93/09405

§ 371 Date: Apr. 12, 1995

§ 102(e) Date: Apr. 12, 1995

[87] PCT Pub. No.: WO94/08786

PCT Pub. Date: Apr. 28, 1994

[30] Foreign Application Priority Data

Oct. 14, 1992 [RU] Russian Federation ............. 92000566

[51] Int. Cl.⁶ ........................................ B32B 5/16
[52] U.S. Cl. ..................... 428/323; 428/328; 428/330; 428/331; 428/332; 428/336; 428/921

[58] Field of Search ..................... 428/323, 328, 428/330, 331, 332, 336, 920, 921, 408, 447, 448, 451

[56] References Cited

U.S. PATENT DOCUMENTS

| | | | |
|---|---|---|---|
| 3,617,366 | 11/1971 | Tully | 117/135.1 |
| 3,934,066 | 1/1976 | Murch | 428/248 |
| 4,094,951 | 6/1978 | Ishikawa et al. | 264/325 |
| 4,234,638 | 11/1980 | Yamazoe et al. | 428/133 |
| 4,443,357 | 4/1984 | Maloney et al. | 252/321 |
| 4,598,007 | 7/1986 | Kourtides et al. | 428/116 |
| 4,714,650 | 12/1987 | Obayashi et al. | 428/265 |

*Primary Examiner*—Hoa T. Le
*Attorney, Agent, or Firm*—Poms, Smith, Lande & Rose

[57] ABSTRACT

A fire-resistant multipurpose protective coating is provided by means of a two-layer coating in which the first layer is a heat-resistant oxidized graphite layer and the second layer is a hydrophobic highly-dispersed-hydrophobic-powder layer containing a silicone liquid. The coating is effective in protecting various substances from fire, strong thermal fluxes, corrosion, acids, bases, electrolytes, other corrosive liquids, and microorganisms.

8 Claims, No Drawings

FIRE RESISTANT MULTIPURPOSE PROTECTIVE COATING

BACKGROUND OF THE INVENTION

1. Field of the Invention

This invention relates to materials technology and more particularly to protective coatings. In one of its more particular aspects the present invention is directed to multipurpose coatings having properties which make them useful for protecting surfaces exposed to fire, thermal fluxes, corrosion, destructive chemical agents, such as acids, alkalies and other strong electrolytes, and microorganisms.

2. Description of Related Art

Various surfaces have been protected against combustion by means of coatings containing fireproofing compounds as fillers. A disadvantage of the use of such fireproofing materials is that it has not been possible to achieve comprehensive multi-function heat protection at heat levels exceeding about 120 J/m$^2$. Nor do such materials protect against damage from open flames, acids, alkalies, and other corrosive liquids or microbiological agents.

A fire-resistant protective coating composition for wood products is disclosed in Inventor's Certificate, USSR 2822988/23–26, 1979. The composition contains 8.0–11.7 parts by mass dolomite sand, 8.0–10 parts expanded perlite, 1.2–2.6 parts asbestos fiber, 42–53.6 parts aluminochromium phosphate binder, 19.5–32.9 parts urea formaldehyde resin, and water. The composition is applied to wood by means of a brush or sprayer, dried for 2–3 hours, and hardened for 24 hours.

In evaluating the fire-resistant properties of the coating it was found that mass losses equaled 2.5–3.3% with zero combustion. The disadvantages of this coating include its poor adhesion, especially to metallic surfaces, its tendency to promote corrosion under humid conditions, and its support of microorganism and algae growth.

A composition and method for obtaining a heat-resistant protective coating for titanium and associated alloy products is disclosed in Inventor's Certificate, USSR 1654339 23–5, 1971. An aqueous colloidal graphite composition is applied to a titanium surface. The composition contains the following components, in percent by weight:

| | |
|---|---|
| colloidal graphite | 30–70 |
| colloidal fire clay | 0.1–5 |
| magnesium oxide | 0.1–1 |
| ammonia solution (25% solution) | 1–5 |
| surfactant | 0.1–1 |
| water | 24–63 |

This heat-resistant coating provides oxidation protection to titanium and its alloys when heated to temperatures of 1050° C. in air. The coating has good lubricant and adhesive properties as well as good wettability. The strong plastic properties of the coating permit repeated heating of the coated surfaces and hot deformation without repainting.

The colloidal fire clay is prepared by mixing 15% fire clay with 1% magnesium oxide, and then stirring in water. Water-soluble oxyethylated alkylphenol surfactants are added to the required water quantity, after which a 25% ammonia solution, colloidal fire clay, and colloidal graphite are added. The coating is applied by immersion to a metal surface preheated to a temperature of 100° C. The coated surface is then dried in a drying oven at a temperature of 110°–120° C. until completely dry.

Some of the drawbacks of this method of producing a fire-resistant coating are the lack of multi-function protective capabilities, water sensitivity of the coated surface, sensitivity to corrosion, sensitivity to microorganisms and algae, and poor mechanical strength.

It is accordingly an object of the present invention to increase the heat resistance of coatings for metals and other substrates.

Another object is to expand the field of application and the protective functions of the coatings.

Another object of this invention is to increase the resistance of coated surfaces to open flame, strong heat fluxes, and radiation, as well as chemical agents, microorganisms, and weather factors.

SUMMARY OF THE INVENTION

A fire-resistant multipurpose protective coating is provided by application to a substrate of a two layer composition. The first layer, which is a continuous layer, having a thickness of about 0.1 mm to 1 mm, contains oxidized graphite particles in a polymeric medium. The second layer, which is applied after the first layer dries, is a collection of solid particles which mechanically adhere to the surface of the first layer and has a thickness of about 40 Å to 10 μm. The second layer contains a mixture of a highly dispersed hydrophobic powder, an adhesive, a silicone liquid, and a solvent.

The dual layer coating provides protection against high temperatures, open fires, acids, bases and other corrosive liquids as well as protection against microorganisms.

DESCRIPTION OF THE PREFERRED EMBODIMENTS

In the protective coatings of the present invention the first layer, which consists of a polymer resin containing about 2–28% by weight of an oxidized graphite, provides protection from the effects of intense heat and halts the spread of fires. The polymer resin which serves as a high temperature binder can be an epoxy, acrylic or silicone lacquer. Epoxy lacquer is based on low and medium molecular weight epoxy resins, are linear polyesters with epoxy groups at both ends of the molecular chain and secondary hydroxyl groups distributed along the entire chain. Epoxy lacquers contain curing agents in addition to resins. For example, one suitable lacquer contains a curing agent which consists of a 30% solution of polyamide in ethyl alcohol. Another suitable curing agent is a 50% solution of hexamethylenediamine in ethyl alcohol. Any epoxy lacquer used as an industrial coating to protect structural materials fabricated of steel, aluminum or titanium alloys from corrosion and atmospheric effects can be used for purposes of the present invention. Suitable acrylic lacquers are, for example, those based on copolymers of butylmethacrylate and methacrylic acid. Silicone resins such as organosilicon enamels and polyorganosiloxanes can also be used as the polymer resin in the first layer. One example of a suitable organosilicon enamel consists of methylphenylsiloxane lacquer with a polyorganosilazane hardening agent. In use, the hardening agent is added to the enamel immediately before use. Any organosilicon enamel which is used as a protective coating for articles fabricated of steel, brass, aluminum alloys or titanium alloys which are subject to a long exposure to high temperatures of up to 400° C. and also subject to atmospheric effects can be used in this invention.

The oxidized graphite particles are generally derived from various forms of graphite through intercalation with various oxidizing agents. Graphites of various purities can be used for this purpose. For example, graphite used in storage batteries has a gangue or an impurity content of about 2%, whereas crucible graphite may have a gangue content as high as about 7%, and scrap graphite a gangue content as high as about 9%.

Typically, the graphite staring material is placed into an acid solution containing a strong oxidizing agent such as potassium dichromate, $K_2Cr_2O_7$, nitric acid $HNO_3$, or ammonium persulfate, $(NH_4)_2S_2O_8$. In general, intercalation compounds are formed by inserting extra atoms or molecules into a host structure without disrupting the chemical bonds of the host material. Carbon atoms in graphite are located at the points of a hexagonal lattice and kept in place through relatively strong covalent bonds. In contrast, the hexagonal lattices are displaced relative to each other and held in place by weak Van Der Waals forces. The lower bond energy between the lattices and packing defects make the graphite particles susceptible to the insertion of foreign materials. For the production of graphite intercalation compounds, graphite powder is heat treated in the presence of a gaseous or liquid agent. The pressure at which actual intercalation begins is dependent on the polarity and the structural disorder of the graphite. The inherent properties of the graphite allow such host structures to expand to well over 100 times their original volume during decomposition at elevated temperatures.

Preferably, the production of intercalated graphite starts with highly ordered graphite flakes which exhibit stack heights of at least about 75 nm. Such flakes are treated with an oxidizing agent at a temperature of approximately 100° C. to yield an intercalation compound. Especially preferred oxidizing agents are mixtures of sulfuric acid with other oxidizing agents such as potassium dichromate, $K_2Cr_2O_7$, potassium permanganate, $KMnO_4$, nitric acid, $HNO_3$, or ammonium persulfate, $(NH_4)_2S_2O_8$. Especially preferred are mixtures of sulfuric acid and ammonium persulfate.

The second layer contains the following composition in percent by weight:

| | |
|---|---|
| highly-dispersed hydrophobic powder | 2–40 |
| adhesive | 0.1–10 |
| silicone liquid | 0.1–10 |
| solvent | remainder |

The highly dispersed hydrophobic powder can be prepared from a number of finely divided inorganic materials which are rendered hydrophobic by various chemical treatments. Suitable finely divided systems include silicas, such as Aerosil, perlite, hydrolyzed graphite, titanium dioxide, zinc oxide and mica-muscovite. The highly dispersed hydrophobic powder is produced by a surface modification process which is achieved through preliminary activation with an alkali or an alkaline salt in an amount equal to about 15–25 wt. % of the material to be modified. Subsequent to such modification the material is treated with a silylating agent such as dimethyl dichlorosilane in an amount equal to about 14–40% by weight of the modified material. For example, a finely divided system such as perlite is immersed in a flask containing soda and stirred for ten minutes. The mixture is then poured into dimethyldichlorosilane (DMDS) and stirred for another fifteen to twenty minutes, with the maximum overall duration of the modification process being about fifty minutes. Hydrophobic silicas and other finely divided systems are thereby obtained. Typical reaction conditions are shown in Table I.

TABLE 1

| No. | Finely-divided system | Particle size, μm | Bulk density, kg/m₃ | Composition of reactant mixture | Process temperature, degrees C. |
|---|---|---|---|---|---|
| 1 | Aerosil A175 | 5–20 | 50 | $SiO_2$, $Na_2CO_3$ (KOH), DMDS | 50 |
| 2 | Perlite, filtered | 25 | 120 | Perlite, $Na_2CO_3$ (KOH), DMDS | 65 |
| 3 | Graphite, hydroxylized, dried | 50–500 | 12 | Graphite, $Na_2CO_3$ (KOH), DMDS | 30 |
| 4 | Titanium dioxide (anatase) | 0.3 | 2000 | $TiO_2$, $Na_2CO_3$ (KOH), DMDS | 35 |
| 5 | Zinc oxide | 0.1–1.0 | 2750–3300 | ZnO, $Na_2CO_3$ (KOH), DMDS | 35 |
| 6 | Mica-muscovite (wet grinding) | 5–20 | | $KAl_2[AlSi_3O_{10}](OH)_2$, $Na_2CO_3$ (KOH), DMDS | 50 |

The particle sizes of the highly dispersed hydrophobic powder range from about 40 Å to 10 μm.

For the adhesive any of the polymer resin lacquers used for the polymer resin of the first layer can be used as the adhesive in the second layer. In addition, vaseline or paraffin can be used as the adhesive. In general, any polymer or oligomer which will retain the highly dispersed hydrophobic powder upon the dried first layer can be used in the present invention.

The silicone liquid which is used in the present invention functions as a synergetic agent to enhance the hydrophobic properties of the highly dispersed hydrophobic powder. Although the highly dispersed hydrophobic powder by itself is known to have water repulsion properties, yet the highly dispersed hydrophobic powder itself is insufficient to provide the desired degree of protection due to a steric factor. Since the solid particles of the highly dispersed hydrophobic powder have a spatial geometry such that they cannot maintain uniform and continuous properties across the entire surface to be protected, it is necessary to provide a synergetic additive fluid which can fill the gaps that cannot be filled by the highly dispersed hydrophobic powder due to such steric factor. The synergetic additive of the present invention, that is the silicone liquid, itself has hydrophobic properties. However, it is the combination of the highly dispersed hydrophobic powder and the silicone liquid which together manifest the properties desired to protect the surface from water and moisture and corrosive and other degrading materials.

The silicone liquid used in the process of the present invention is an organosilicon liquid such as a silane, siloxane, silazane or silanolate. Representative silanes include dimethyldichlorosilane and methyltrichlorosilane, as well as alkylalkoxysilanes, $R_xSi(OR)_{4-x}$ and organoaminosilanes $R_xSi(NR_2)_{4-x}$. Typical siloxanes include polymethylsiloxane and polyethylsiloxane as well as polyalkylhydrosiloxanes $[Si(R)_2(H)O]_n$. Representative silazanes are polyorganosilazanes of the formula $[R_2SiNH]_n$. Typical silanolates are organosilanolates of alkali metals, for example, those having the formula $R_2Si(OH)_2ONa$ in mass fractions of 0.2 to 5.0.

In general, any organosilicon liquid which provides the function of cooperating with the highly dispersed hydrophobic powder to form a hydrophobic layer can be used.

Solvents used are volatile organic solvents such as acetone, hexane, dichloroethane, ethanol, gasoline or ether.

Both layers of the coating can be applied by traditional methods including the use of a brush, roller, paint sprayer or by immersion. The thickness of the first layer will be determined by the viscosity of the polymer resin binder and may be about 0.1 to 1 millimeter thick. The second layer, which is formed after application of the dispersion resulting from admixture of the highly dispersed hydrophobic powder, the adhesive, the silicone liquid and the solvent, which can be any organically volatile liquid, is not a solid continuous layer but is rather a collection of solid particles that mechanically adhere to the surface of the first layer. The thickness of the second layer will depend on the diameter of the powder particles or the size of the agglomerates of these particles and will be between about 40 Å and 10 μm since the large particles will be individually distributed while the smaller particles will appear as agglomerates. The adhesive will not form a continuous film on the surface of the first layer of the coating since it may not dissolve in the solvent.

The fire-resistant multipurpose protective coating of the present invention can be used in a number of different applications. Some of these applications are for high level heat protection to automatic aircraft flight recording systems ("black boxes"); fire protection of the external surfaces of petroleum reservoirs containing organic solvents, corrosive fluids and highly toxic poisons under exposure to flame, lightning, strong heat fluxes and electrical pulses; for protecting atomic power facilities as well as the internal surfaces of components in atomic power plants; for protecting compartments in atomic submarines and ships; for coatings to prevent spreading of fire from shorting in high voltage cables; for providing protective safety clothing for personnel working in chemical industries, smelters, on fire-fighting teams, in safety crews, for heat damage and damage due to acids, bases, electrolytes, rocket fuels and corrosive fluids; for protection of radio equipment from strong thermal fluxes as well as corrosive fluids; for reliability improvements to search and rescue technology equipment; for protection of measurement instrumentation in regions of high thermal radiation, as well as from acids, bases, electrolytes and other corrosive media; for use in electrical and thermal insulation material for reactors, heat exchangers and radio-electronic equipment; for oil and lubricant resistant self-lubricating seal rings for fluid pumps and couplings; for sealing of couplings; for sealing of internal cavities; for use with electric current pickups (brushes); as an ablation coating for spacecraft for re-entry into the atmosphere; for use in pencils; for use in electrodes; for fire protection for safes; in the manufacture of electric heaters and electrical insulation; for coating of protective covers for instruments and equipment for protection against strong heat and thermal fluxes, acids, alkalies, electrolytes, and other corrosive liquids; for sealing of joints and seams in construction panels; for fabricating products of complex configuration, which are subsequently exposed to thermal shock (annealing); and for seals for engines. Many of the above mentioned applications utilize the properties of both the first and second layers described herein, that is, the property of the underlayer of rejecting heat and the property of the top layer of rejecting humidity and resisting corrosive and biochemical agents.

Because the oxidized graphite used in the underlayer is an unexpanded oxidized graphite powder capable of expansion by several orders of magnitude upon heating to high temperatures, the material can readily function as a sealant upon being heated.

The invention will be better understood by reference to the following examples.

EXAMPLE 1

A fire-resistant multi-functional protective coating was applied to solid aluminum alloy plates as follows: The surfaces of aluminum alloy plates were cleaned with alcohol and anodized in the standard manner. The first layers were prepared by mixing a medium molecular weight epoxy resin, a 50% solution of hexamethylenediamine in ethyl alcohol, and dioctyl phthalate in a ratio of 6:4:1. Fifteen, 20 and 46 percent by weight oxidized crucible graphite powder was then added. The epoxy binder and oxidized graphite powder were mixed and applied to the aluminum alloy plates as the first layer of the coating 0.75 mm thick. The starting material used for the production of the oxidized graphite powder was large-flake graphite obtained from the Zaval'evskiy deposit located in the Ukraine. After crushing, grinding and flotation beneficiation, a concentrate was obtained containing up to 10% gangue. From this precursor material various grades of graphite were produced differing only in their concentration of gangue. These include crucible graphite, pencil graphite, battery graphite, cast graphite, and scrap graphite.

Following the preparation of a suitable graphite sample, a charge of 10 to 20 grams of the material was treated with concentrated sulfuric acid mixed with approximately 2% potassium dichromate for one hour. During the oxidation process the flakes were separated and crushed. The suspension was then diluted with water, before the graphite was filtered to remove the excess oxidizer and dried on a ceramic filter to a moisture content of 40–50%. The amount of sulfuric acid remaining in the graphite was monitored by observing the pH of the wash water. When the wash was neutral the graphite was collected and partially dried. The bulk density of the raw material was 400–520 g/l, that of the wet, treated graphite was 1070–1200 g/l. This procedure was repeated using several different grades of graphite. The oxidized graphite was present in the first layers in a concentration of 2, 12 and 28 percent by weight, dry basis, respectively.

The second layer composition was then prepared by mixing hydrophobic perlite powder with particle dimensions of 2 μm in a quantity of 40, 30 and 2 percent by weight with 0.5, 5 and 10 percent dimethyldichlorosilane; 10, 5 and 0.5 percent low molecular weight epoxy resin containing a 30% solution of polyamide resin in ethyl alcohol; and a solvent containing 12% butyl acetate, 26% acetone and 62% toluene.

The first layer was hardened for 15–20 minutes, after which the second layer composition was applied to each plate. The two-layer protective coating obtained in this manner was then dried completely. The coated aluminum alloy plates were exposed to continuous 100–130 W/cm$^2$ laser radiation. No damage or breakage was observed for a period of three days after exposure of the plates to moisture, chemically active reagents, concentrated acids or alkalies.

In contrast, aluminum alloy plates coated with a known composition containing 28 percent oxidized graphite were damaged by bases, and corrode 100% in 3 days in acidic and saline solutions.

EXAMPLE 2

A coating was fabricated using the first layers of Example 1. The second layer of the coating consisted of a copolymer of butyl methacrylate and methacrylic acid, 5 percent by weight; hydrophobic Aerosil, 12%; polymethylsiloxane, 5 percent; and acetone. The coatings were applied to 50×100×2 mm steel plates and a known composition containing 28 percent oxidized graphite was applied to three identical plates. The six samples were placed in a temperature chamber and run through accelerated climate tests (ACT). The corrosive damage to the samples was determined. The results are shown in Table 2.

TABLE 2

| METHOD OF COATING PREPARATION | SAMPLE NUMBER | STEEL CORROSION IN %, AS A FUNCTION OF THE NUMBER OF ACT CYCLES | | | | | |
|---|---|---|---|---|---|---|---|
| | | 10 | 20 | 50 | 100 | 150 | 180 |
| In accordance with the invention | 4 | 0 | 0 | 0 | 0 | 2 | 5 |
| | 5 | 0 | 0 | 0 | 0 | 0 | 0 |
| | 6 | 0 | 0 | 0 | 1 | 3 | 8 |
| Existing Method | 1 | 0 | 8 | 30 | 90 | 100 | 100 |
| | 2 | 1 | 10 | 30 | 95 | 100 | 100 |
| | 3 | 0 | 8 | 25 | 90 | 100 | 100 |

EXAMPLE 3

Two cotton fabric samples were coated with a first layer consisting of polyvinylchloride and 28% percent by weight oxidized graphite applied in polyspherical droplets 2 and 8 mm in radius with an equal distance between droplet centers of 7 and 13 mm. The samples were then coated with the second layer composition as described in Example 1.

Exposure of the coated samples to concentrated hydrochloric, sulfuric, nitric and phosphoric acids, as well as alkalies for several hours resulted in no visible fabric damage. Unprotected fabric and fabric treated with the known composition described in Examples 1 and 2 broke down nearly instantaneously upon exposure to the acids. Upon exposure to thermal fluxes of 3200° C. for 15–20 seconds, the unprotected fabric burned through, while the fabric coated in accordance with the present invention retained its structure and mechanical properties.

EXAMPLE 4

The procedure of Example 1 was followed using various different compositions for the first and second layers in accordance with the present invention (Sample Numbers 7–11) as well as the commonly used coating described in Examples 1 and 2 (Sample Number 12). The results are shown in Table 3.

TABLE 3

| CHARAC- TERISTICS | SAMPLE NUMBER | | | | | |
|---|---|---|---|---|---|---|
| | 7 | 8 | 9 | 10 | 11 | 12 |
| COMPOSITION OF FIRST LAYER | | | | | | |
| Polymer resin | Organosilicon enamel | Polyorgano siloxane | Epoxy lacquer (med. Mw) | Acrylic lacquer | Epoxy lacquer (low Mw) | |
| Oxidized graphite concentration, % by weight, dry basis | 18 | 20 | 28 | 5 | 10 | 28 |
| Thickness, mm | 0.5 | 0.9 | 1.0 | 0.1 | 0.1 | 1.0 |
| COMPOSITION OF SECOND LAYER | | | | | | |
| Solvent | Acetone | hexane | dichlorethane | ethanol | gasoline | water |
| Adhesive (parts by weight) | Epoxy lacquer (low Mw) (3) | paraffin (10) | PMMA (0.2) | Acrylic lacquer (10) | vaseline (15) | |
| Silicone liquid (parts by weight) | Polymethyl- siloxane (10) | Polyethyl- siloxane (5) | Dimethyldi- chlorsilane (0.1) | ethyl- trichloro- silane (2) | Poly- methyl- siloxane (0.2) | 1.0 |
| Highly-dispersed hydrophobic powder (parts by weight) | Aerosil (10) | perlite (20) | talcum (2) | Aerosil (30) | Talcum (40) | |
| Particle size, Å | 40 | 10000 | 4000 | 80 | 2000 | |

Having thus described various embodiments of the present invention, it will be understood by those skilled in the art that the within disclosures are exemplary only and that the present invention is limited only by the following claims.

What is claimed is:

1. A fire resistant multi-purpose protective coating which comprises:

a heat resistant, continuous bottom layer consisting of a polymer resin and about 2–28 wt %, based on the weight of said bottom layer, oxidized graphite, and a hydrophobic top layer comprising an inorganic hydrophobic powder, an adhesive, a silicone liquid, and a volatile organic solvent;

said bottom layer having a thickness of about 0.1 mm to 1 mm; and said top layer having a thickness of about 40 Å to 10 μm.

2. The coating of claim 1 wherein said polymer resin comprises a polymer resin lacquer.

3. The coating of claim 2 wherein said polymer resin lacquer is a member selected from the group consisting of epoxy lacquers, acrylic lacquers and silicone lacquers.

4. The coating of claim 1 wherein said top layer comprises in percent by weight:

| | |
|---|---|
| [highly-dispersed] inorganic hydrophobic powder | 2–40 |
| adhesive | 0.1–10 |
| silicone liquid | 0.1–10 |
| volatile solvent | 40–97.8. |

5. The coating of claim 1 wherein said inorganic hydrophobic powder is a silylated inorganic powder selected from the group consisting of silylated silica, perlite, hydrolyzed graphite, titanium dioxide, zinc oxide, mica-muscovite, and talcum.

6. The coating of claim 1 wherein said adhesive comprises a member selected from the group consisting of polymeric adhesives, oligomeric adhesives, and petroleum extracts.

7. The coating of claim 1 wherein said silicone liquid comprises a member selected from the group consisting of alkylhalosilanes, alkylalkoxysilanes, organoaminosilanes, polyorganosiloxanes, polyorganosilazanes, and organosilanolates.

8. The coating of claim 1 wherein said solvent is a member selected from the group consisting of acetone, hexane, dicholoroethane, and ethanol.

\* \* \* \* \*